Oct. 27, 1959
H. A. TOULMIN, JR
2,910,384
POLYETHYLENE ADHERENT TO METAL SURFACE
AND METHOD OF MAKING SAME
Filed Dec. 14, 1956
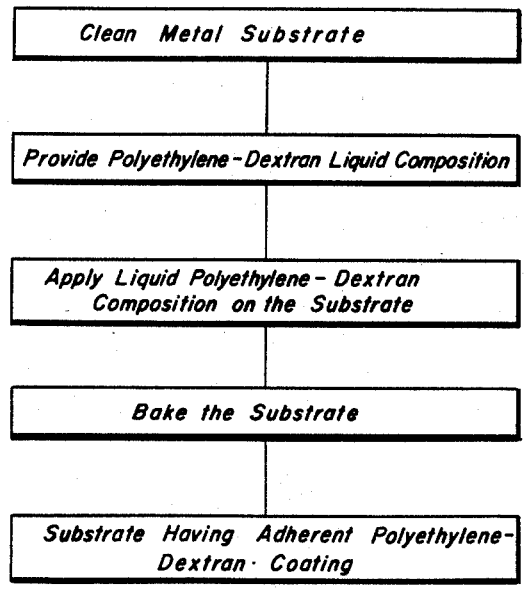
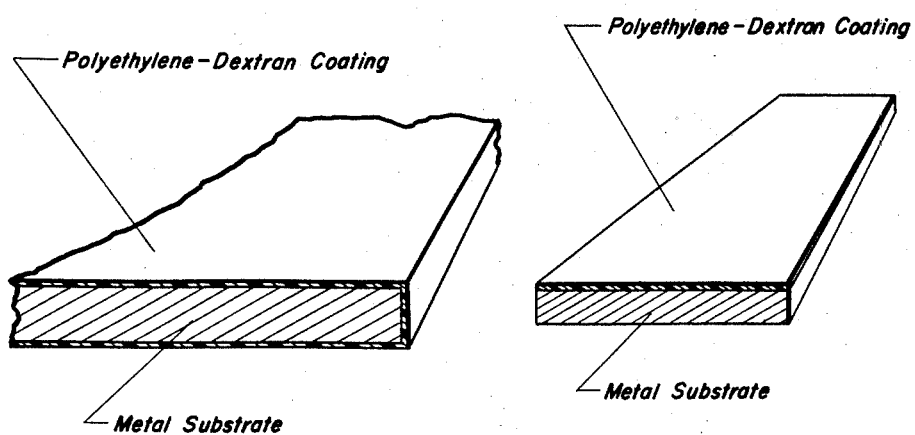
INVENTOR
HARRY A. TOULMIN, Jr.
BY  *Toulmin & Toulmin*
ATTORNEYS

United States Patent Office

2,910,384
Patented Oct. 27, 1959

2,910,384

POLYETHYLENE ADHERENT TO METAL SURFACE AND METHOD OF MAKING SAME

Harry A. Toulmin, Jr., Dayton, Ohio, assignor to The Commonwealth Engineering Company of Ohio, Dayton, Ohio Application December 14, 1956, Serial No. 628,226

3 Claims. (Cl. 117—132)

This invention relates to improvements in coated metal articles and more particularly polyethylene coated metal substrate.

It is known that polyethylene is an excellent material for forming protective coatings for metallic and other surfaces because of its high resistance to attack by chemicals, while exhibiting an extremely tough yet highly flexible film. Protective coatings for metal surfaces, however, must not only be tough and resistant to chemical attack, but must firmly adhere to the surface. The production of continuous coatings that have good adhesion to the metal surface is difficult to accomplish because of the nature of polyethylene.

In the use of coatings for containers, such as for packing food, beverages and the like, the coating must possess excellent adhesion characteristics. It must withstand processing of the container contents at elevated temperatures, e.g., 1 to 2 hours at 120–125° C. in the presence of water and foodstuff. The coating must remain strongly adherent to the metal surface and impermeable during processing operations otherwise a satisfactory product cannot be obtained.

Polyethylene solid polymers, and such as have a molecular weight of between about 10,000 and 2,000, are highly inert and due to their flexibility and cold drawing properties the polymer can withstand the operations during manufacture of cans which include bending, crimping, shaping and drawing.

Polymers of ethylene form useful coatings for metals, are solid or semi-solid and may be obtained by known processes in the art, and as produced by polymerization of ethylene under heat and pressure or using suitable mixtures of ethylene and other compounds containing at least one polymer forming unsaturated linkage (C=C). These polymers may be produced, for example, by heating ethylene or a mixture as aforementioned under a pressure of 300 to 1200 atmospheres at temperatures of from 100 to 500° C. as described in the art. Polyethylene polymers suitable for use in coating compositions may be made by heating ethylene alone or mixed with polymerizable material in contact with water and a catalyst at temperatures of 40 to 350° C. and under super-atmospheric pressures and above two atmospheres. The physical properties of the polyethylene thus produced vary depending upon the composition of the polymer and the nature of the organic compound polymerized with the ethylene.

It is an object of this invention to provide new and improved polyethylene coating compositions which have enhanced adhesion properties.

Another object is to provide improved ethylene polymer coated metal articles.

A further object is to provide a polyethylene coating composition which forms a tough, continuous and adherent film on metallic and other surfaces.

Another object is to provide a polyethylene coating film which exhibits good adhesion on metal surfaces by mixing benzyl dextran derivatives therewith in an amount sufficient to produce polyethylene coating films which are adherent to the surface of metal substrate.

These and other objects and advantages will appear from the following description of the invention.

Briefly, the invention and objects are accomplished by admixing with the polyethylene from 1 to 20% by weight of a blend of organic solvent benzyl dextran and an ester of a dextran or dextran conversion product with a fatty acid containing from 8 to 18 carbon atoms and which is dissolved in a common volatile solvent for polyethylene, e.g. xylene, toluene and the like. By thus modifying the polyethylene a coating composition is provided which, on application to metal surfaces and baked at a temperature of 200–300° C. until the film becomes insoluble in a solvent for the untreated polymer, forms a tough, tenaciously adherent durable film.

A suitable blend of benzyl dextran and dextran fatty acid ester, e.g., stearate, palmitate or dextran stearate-palmitate is made as described in my U.S. Patent No. 2,734,828.

The benzyl dextran may be prepared by any suitable method, as for example by the method described in U.S. Patents Nos. 2,203,702 and 2,203,703 to G. L. Stahly and W. W. Carlson, and which involves heating a solution of a dextran with benzyl chloride and sodium hydroxide for suitable time periods and at suitable temperatures until the benzyl radical is substituted for hydroxyl groups of the dextran and the resultant ether is soluble in organic solvents.

The esters of dextran with the higher fatty acids may also be prepared in any suitable manner. Methods for preparing them are disclosed in the pending application of L. J. Novak and J. T. Tyree, Serial No. 351,743, filed April 28, 1943, and now abandoned. Thus, the dextran or a dextran derivative or conversion product containing free hydroxyl groups is reacted with an esterifying derivative of the higher fatty acid, and preferably a halide such as the chloride thereof, in the presence of an acid acceptor or binding agent such as an organic base, as for instance a tertiary heterocyclic amine of the type of quinoline, pyridine, N-methyl morpholine, etc., and in the presence of a substance in which the reaction product is at least partially solvated, that is dissolved or swollen, as it is formed during the reaction, which results in the reaction mass being maintained in a highly swollen or dissolved state and thus insures substantially uniform, homogeneous reaction between the dextran and the esterifying agent. Substances which dissolve or swell the ester as it is formed are, for example, xylene, toluene, dioxane, etc. In general, the reaction is carried out at temperatures between 100° C. and 155° C. for time periods varying inversely with the temperature between a half hour and three hours, both the temperature and the reaction depending on the boiling point of the mixture of acid acceptor and solvating agent used. Thus, if a mixture of quinoline and xylene is used, the reaction may be effected by heating the mass at from 150° to 155° C. for from one-half hour to an hour, whereas when a mixture of pyridine and toluene, which has a relatively low boiling point, is employed, the reaction is preferably run at temperatures of 100° to 115° C. for from one to three hours. The dextran high fatty acid ester is recovered from the crude reaction mix, in which it is at least partially dissolved, by washing the mixture with water to remove the hydrochloride of the organic base, e.g., pyridine hydrochloride or quinoline hydrochloride, removing the aqueous layer, adding a solvent for the ester to the residual mass, and precipitating the solution thus obtained into a non-solvent for the ester, such as a lower aliphatic alcohol, e.g., methanol, ethanol, isopropanol, etc., and filtering the ester, which may be further purified by reprecipitation, if desired, and dried.

The higher fatty acids, which may be used in the free acid condition or in the form of their chlorides, are those containing from 8 to 18 carbon atoms and including caprylic, pelargonic, capric, undecylic, lauric, tridecylic, myristic, pentadecylic, palmitic, margaric and stearic acids, and the corresponding chlorides. Two or more of the substantially pure saturated acids, or chlorides thereof, may be used, resulting in the production of mixed higher fatty acid esters of the dextran or its conversion product, or commercial acids, which comprise mixtures may be used. For example, there may be used commercial or technical grade stearic acid, which comprises a mixture of stearic and palmitic acids, and results in the production of dextran stearate-palmitate.

In general, the esterifying agent is used in an amount of from less than 1.0 to 10.0 or more parts thereof by weight per part of the dextran, for reaction times and at reaction temperatures generally inversely related to the relative proportions of dextran and esterifying agent, longer reaction times and higher temperatures being employed with amounts of the esterifying agent near the lower limit of the stated range, shorter reaction times and lower temperatures being used with amounts of the esterifying agent near the upper limit of the stated range.

The end products may have a D.S. (average degree or substitution or ratio of higher fatty acid radicals to anhydroglucopyranosidic units of the dextran) of from less than 1.0 to 3.0.

These higher saturated fatty acid esters of the dextrans are moisture-resistant to an extent depending on the D.S. and the particular fatty acid radicals introduced into the dextran molecule, as well as the dextran esterified. Those in which the D.S. approaches the theoretically possible maximum of 3.0 fatty acid radicals per anhydroglucopyranosidic unit, e.g. those in which the average D.S. is between about 2.5 and 3.0 are hydrophobic and soluble in organic solvents, particularly those of the non-polar type such as the halogenated hydrocarbons, e.g., chloroform, carbon tetrachloride, and the "Freons" (commercially available chlorofluoro-methanes of the type "Freon 11," a trichloromonofluoromethane, and "Freon 12," a dichlorodifluoromethane), and in the aromatic hydrocarbons of the type of benzene, toluene and the xylenes. Since these solvents are also solvents for the benzyl dextrans, the ester and ether may be dissolved therein for application to a base, for instance to a metal base.

The solutions may be prepared in any convenient way. Thus the benzyl dextran and the selected fatty acid ester may be pre-mixed or pre-blended and then dissolved in the solvent, or either the ester or the ether may be dissolved, and the other added to the solution with stirring to insure a homogeneous composition.

The dextran esters and the benzyl dextran are compatible in all proportions and may be used in relative amounts of from 5 to 95% by weight of one and 95 to 5% of the other. However, for the present purposes it is preferred to employ the ester and ether in approximately equivalent amounts or to use an excess of the benzyl dextran.

The following examples are given to illustrate specific embodiments of the invention and which are not intended to be limitative thereof it being also understood that the proportions and conditions given are relative and approximate, thus may be modified depending upon the variable factors inherent in any particular coating application. In the examples the parts given are by weight unless otherwise specified.

*Example I*

A blend of 15 parts benzyl dextran and 5 parts dextran palmitate containing an average of 2.9 palmitoyl radicals per anhydroglucopyranosidic unit is dissolved in approximately 90 parts xylene (approx. 135° C.). Ten parts of the resultant benzyl dextran-dextran ester blend is admixed with 100 parts of ethylene polymer of average molecular weight of 15,000 and which is dissolved in 500 parts of hot xylene (135° C.).

This composition is applied to a clean steel panel and baked at a temperature of 250° C. in contact with air for ten minutes or until the film becomes insoluble in xylene, to provide the panel with a tough, adherent coating of polyethylene.

*Example II*

Ten parts of benzyl dextran and 10 parts of a dextran stearate containing an average of 2.9 stearoyl radicals per anhydroglucopyranosidic unit are dissolved in 95 parts of benzene. Fifteen parts of the resultant benzyl dextran-dextran stearate blend is admixed with 100 parts of ethylene polymer of an average molecular weight of about 10,000 dissolved in 600 parts of hot xylene. The resultant coating composition is applied to a chemically clean steel panel and baked at 250° C. for 15 minutes to provide a tough, adherent coating thereon.

*Example III*

A mixture of ten parts polyethylene (mol. wt. 20,000) dissolved in 80 parts of solvent naphtha (boiling range 130°–150° C.) and 2 parts of benzyl dextran-dextran palmitate blend (1:1 by weight) is heated to approximately 125° C. while stirred and then allowed to cool gradually to room temperature. The resultant polyethylene dispersion is flowed onto a sheet of tin plate for fabrication into a container and baked ten minutes at 250° C. A tough, adherent, flexible coat is provided on the sheet which can be formed into a container.

*Example IV*

In this instance the polyethylene dextran blend as described in Example III is thinned with hot xylene to spraying consistency and sprayed onto an aluminum sheet and baked for ten minutes at 250° C. to form a flexible, tough, adherent coating thereon which is inert and insoluble in organic solvents.

*Example V*

A mixture of 50 parts polyethylene (mol. wt. 18,000) in the form of powder admixed with 5 parts of benzyl dextran-dextran palmitate (15:5, Example I) is dusted on a clean steel panel heated to 150° C. After removing the excess of the powdered mixture by lightly shaking the panel, the coated panel is baked for 20 minutes at 200° C. in air. The resultant panel upon cooling is provided with an adherent coating of polyethylene.

Suitable liquid solvents which may be used in preparing the polyethylene coating films of this invention include benzene, toluene, xylene, ethylene chloride, chlorobenzene, trichloroethylene and tetrachloroethylene. The solvent chosen for any particular polyethylene, of course, will be one capable of dissolving at least about 20% of the polymer. For use with powdered mixtures of polyethylene, as described in Example V, suitable solid hydrocarbon solvents may be used in varying proportionate amounts. For this purpose use may be made of chlorinated hydrocarbons particularly of the cyclic series, boiling between 150° and 300° C., such as naphthalene, diphenyl, dibenzyl, paradichlorobenzene, and dichloronaphthalenes.

Polyethylene or ethylene polymer is intended to include products obtained by polymerizing ethylene alone or in admixture with compounds containing a polymer forming unsaturated groups, such as for example vinyl acetate, vinyl chloride, vinyl chloroacetate, vinyl ethers, ketones, esters, amides, imides, and carboxylic acids, esters and anhydrides.

The dextran-modified polyethylene coating may be applied to the metal substrate surface in any of the conventional methods, such as hot-dipping, spraying, brushing and flame spraying of the melted polyethylene.

Where it is desired to obtain harder coatings than obtained by the baking procedures described, the temperature of baking and time may be increased. The temperature and time will vary depending upon the polyethylene used. In general the higher the molecular weight of the polyethylene employed the higher is its melting point. The film thickness to be baked also is a factor affecting the baking temperature and duration. Films up to one mil in thickness may be produced and baked on metal substrates. Thus the temperature may be varied over a range of 150° to 300° C. and from 5 to 30 minutes. To further enhance the hardening of the polyethylene films of this invention, metallic driers or accelerators may be introduced in small amounts (0.1 to 0.2% by wt. of metal). Such metallic driers are those commonly used in paints, e.g. cobalt naphthenate, lead cresinate, manganese dioxide, etc.

It will be understood that the invention is applicable to modifications and which can be made by those skilled in the art without departing from the spirit and scope of the invention, it being appreciated that the invention is not limited to the exact description and examples except as set forth in the appended claims.

What is claimed is:

1. A method of coating metal substrates with polyethylene to provide an adherent film thereon, the improvement which consists in introducing into said polyethylene a blend of benzyl dextran and dextran palmitate, thereafter applying the thus modified polyethylene to the surface of the metal substrate, and baking the same to produce a tough, adherent coating of polyethylene on said metal substrate.

2. A method as set forth in claim 1, wherein the blend consists in parts by weight of 15 parts dextran palmitate, containing an average of 2.9 palmitoyl radicals per anhydroglucopyranosidic unit, dissolved in approximately 90 parts of xylene.

3. A method as set forth in claim 1, wherein said polyethylene comprising 10 parts by weight of said blend in 100 parts of the polyethylene, and the baking is carried out at 250° C. in air for approximately 10 minutes until the resultant polyethylene film is insoluble in xylene.

References Cited in the file of this patent

UNITED STATES PATENTS

| | | |
|---|---|---|
| 2,663,652 | Railing | Dec. 22, 1953 |
| 2,674,584 | Deniston | Apr. 6, 1954 |
| 2,734,828 | Toulmin | Feb. 14, 1956 |